Nov. 13, 1962 S. J. COUGHRAN 3,063,737
DISC HITCH AND WHEEL CONTROL SYSTEM
Filed Feb. 16, 1960 3 Sheets-Sheet 1

SAMUEL J. COUGHRAN,
INVENTOR.
By His Attorneys
HARRIS, KIECH, RUSSELL & KERN.

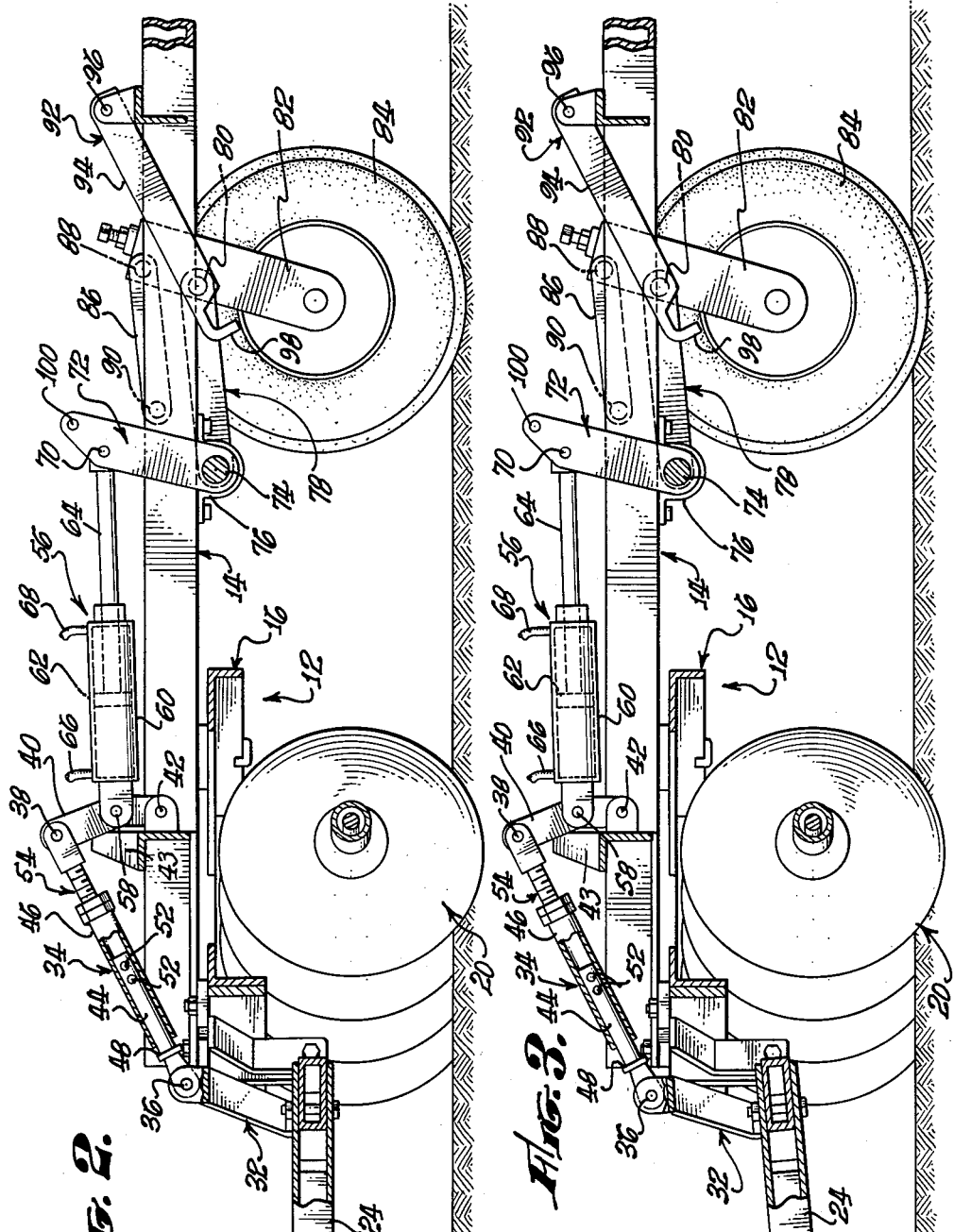

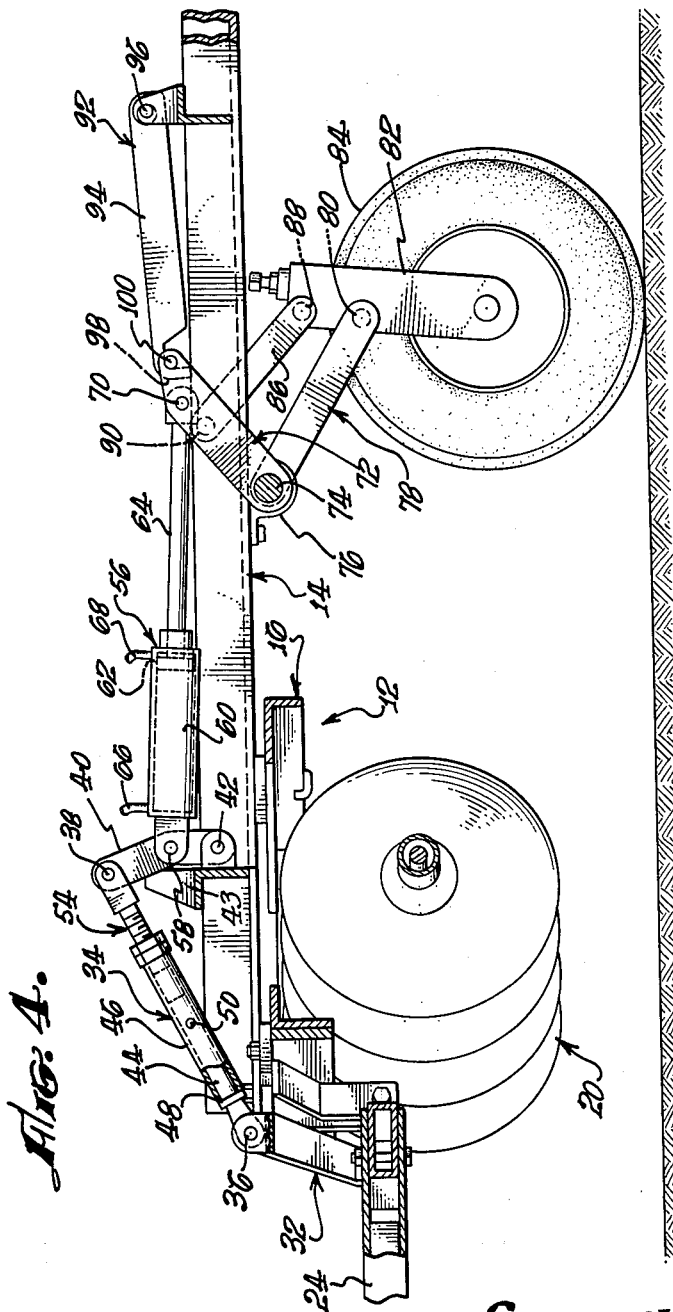

United States Patent Office 3,063,737
Patented Nov. 13, 1962

3,063,737
DISC HITCH AND WHEEL CONTROL SYSTEM
Samuel J. Coughran, Cedartown, Ga., assignor to Towner Manufacturing Company, Santa Ana, Calif., a corporation of California
Filed Feb. 16, 1960, Ser. No. 9,096
2 Claims. (Cl. 280—414.5)

The present invention relates in general to trailing vehicles adapted to be drawn by tractive vehicles and, more particularly, to a trailing vehicle which includes a hitch pivotally connected to the frame of the vehicle for upward and downward pivotal movement, and which includes wheel means pivotally connected to the frame of the vehicle for upward and downward pivotal movement to raise and lower the frame relative to the ground. The invention was originally embodied in and is particularly applicable to a disc or disc plow and, accordingly, will be considered in such connection herein.

A general object of the invention is to provide a control means or system for raising and lowering the wheel means to raise and lower the frame of the disc relative to the ground, and to provide a control means or system for raising and lowering the hitch to facilitate coupling thereof to and uncoupling thereof from a tractive vehicle. An important object of the invention is to provide a control means or system common to the hitch and the wheel means for performing both of these functions.

Another general and important object of the invention is to provide a disc having a strut pivotally connected at one end to the hitch and pivotally connected at its other end to the frame, this strut including two strut elements which are telescopically connected so that the strut may extend and contract when the disc is in operation and is discing an irregular surface. Such extension and contraction of the strut permit the hitch to pivot upwardly and downwardly relative to the frame of the disc so that the disc can follow the contour of the surface with substantially no change in the depth of penetration, which is an important feature.

Another object is to provide the strut with means for preventing or limiting relative telescopic movement of the strut elements when it is desired to register the hitch with the drawbar of a tractive vehicle and when it is desired to lower the wheel means to lift the disc out of the ground.

Another and important object of the invention is to provide a common control means or system for the hitch and the wheel means which includes an extensible and contractible fluid operated motor interconnecting the wheel means and the strut which controls the hitch. Thus, a single motor is utilized to raise and lower the hitch and to raise and lower the wheel means, which is an important feature.

Another object is to provide a disc wherein the fluid operated motor is connected at one end to an upwardly and downwardly pivotable arm means on which the wheel means is mounted, and is connected at its other end to one end of the strut controlling the hitch.

The foregoing objects, advantages, features and results of the present invention, together with various other objects, advantages, features and results thereof which will be evident in the light of this disclosure, may be achieved with the exemplary embodiment of the invention described in detail hereinafter and illustrated in the accompanying drawings, in which:

FIG. 2 is an enlarged, fragmentary sectional view taken along the arrowed line 2—2 of FIG. 1 and showing various components of the disc in one set of operating positions;

FIG. 3 is a view similar to FIG. 2, but showing various components of the disc in another set of operating positions; and FIG. 4 is another view similar to FIG. 2, but showing various components of the disc in still another set of operating positions.

Figure 1:
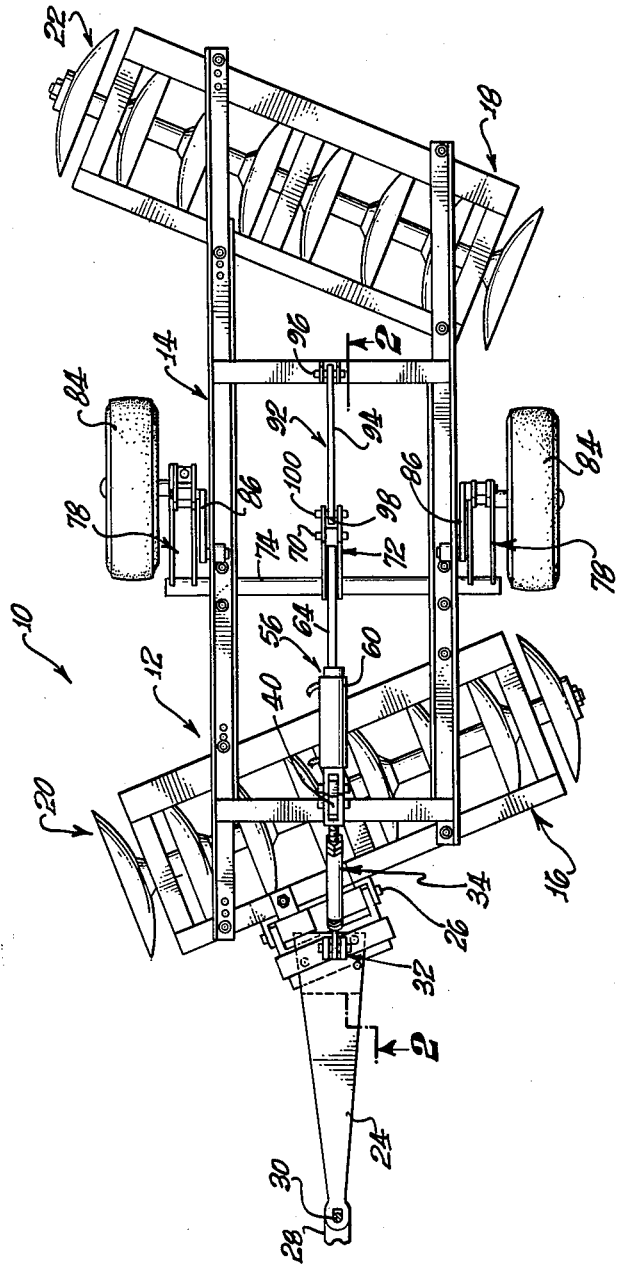
FIG. 1 is a plan view of a disc or disc plow which embodies the invention.

Referring to the drawings, designated generally by the numeral 10 is a disc comprising a frame 12 which includes a main frame 14 and which includes front and rear subframes 16 and 18 interconnected by the main frame. The front and rear subframes 16 and 18 carry front and rear disc gangs 20 and 22 as is conventional.

A hitch 24 is pivotally connected to the front end of the frame 12, or, more accurately, to the front subframe 16, for upward and downward pivotal movement relative to the frame 12. The pivot axis of the hitch 24 is provided by a pivot pin 26 which is substantially horizontal and which is oriented generally transversely of the frame 12. As is conventional, the hitch 24 is adapted to be coupled at its forward end to a drawbar 28 of a tractive vehicle, not shown, as by the means of a coupling pin 30.

The hitch 24 is provided forwardly of the pivot pin 26 with upstanding bracket means 32 to which the front end of a strut 34 is pivotally connected by a horizontal transverse pin 36. The strut 34 extends upwardly and rearwardly and is pivotally connected at its rear end, by a horizontal and transverse pin 38, to the upper end of a lever 40 which, in turn, is pivotally connected at its lower end to the main frame 14 by a horizontal and transverse pin 42, forward pivoting of the lever 40 being limited by a stop 43, as shown in FIGS. 2, 3 and 4 of the drawings. The function of the lever 40 will be explained hereinafter.

The strut 34 includes two telescopically connected, inner and outer strut elements 44 and 46 which are relatively slidable axially of the strut to permit upward and downward pivoting of the hitch 24 relative to the frame 12, as will be apparent from a comparison of FIGS. 2 and 3 of the drawings. The strut 34 is permitted to extend and contract in this fashion when the disc 10 is in operation, whereby the peneration of the disc into the ground remains substantially constant despite irregularities in the contour of the terrain being disced. This is due to the fact that upward and downward movement of the drawbar 28 as the tractive vehicle traverses irregular terrain is not transmitted to the disc 10 since the hitch 24 is free to move upwardly and downwardly.

In the construction illustrated, the inner strut element 44 is at the front end of the strut 34 and is provided adjacent the front end thereof with a shoulder 48 engageable by the front end of the outer strut element 46 to limit upward pivotal movement of the hitch 24 relative to the frame 12 in lifting the disc 10 out of the ground, and under other conditions, as will be explained hereinafter.

The inner and outer strut elements 44 and 46 may also be locked together under conditions to be described by inserting a pin, not shown, through a hole 50 in the outer strut element 46 and one of two or more holes 52 in the inner strut element 44.

The outer strut element 46 includes a threaded adjustment 54 for varying the length thereof to permit varying the range of relative movement of the inner and outer strut elements 44 and 46. As will be apparent, if the outer strut element 46 is lengthened by means of the threaded adjustment 54, it reduces the upward pivotal movement of the hitch 24 because the front end thereof engages the shoulder 48 on the inner strut element 44 with the hitch at a lower level.

The invention includes an extensible and contractible fluid operated motor 56 which is oriented longitudinally of the disc 10 and which is connected at its front end to the lever 40, intermediate the ends of such lever, by a horizontal and transverse pin 58. The motor 56 is shown as including a cylinder 60 at its front end, the cylinder having therein a piston 62 provided with a rearwardly extending piston rod 64.

Fluid lines 66 and 68 are connected to the front and rear ends, respectively, of the cylinder 60 and may be connected to a selector valve, not shown, on the tractive vehicle. It will be understood that such selector valve receives fluid from a pump, not shown, on the tractive vehicle and returns it to a reservoir, not shown, thereon.

The motor 56 is pivotally connected at its rear end, by a horizontal and transverse pin 70, to an arm means 72, shown as comprising a pair of arms, fixed on a horizontal and transverse shaft 74. This shaft is journaled in bearings 76 on the main frame 14 and has two upwardly and downwardly pivotable arm means 78 fixed on its respective ends, each of these arm means being shown as including a pair of arms.

The outer ends of the arm means 78 are pivotally connected, by horizontal and transverse pins 80, to wheel frames 82 respectively having wheels 84 rotatably mounted thereon. The wheel frames 82 are guided by links 86 pivotally connected to the wheel frames at points 88 spaced from the pins 80 and pivotally connected to the main frame 14 at points 90 spaced from the shaft 74. The links 86 cooperate with the arm means 78 to maintain predetermined orientation of the wheel frames 82 as they are moved upwardly and downwardly relative to the frame 12 in a manner to be described.

Operation

As hereinbefore mentioned, when discing rough ground, the telescoping strut 34 extends and contracts to permit the hitch 24 to pivot upwardly and downwardly as the drawbar 28 rises and falls relative to the disc 10, wherefore the disc penetrates to a substantially constant depth. In other words, if the drawbar 28 moves downwardly relative to the disc 10, the front disc gang 20 is not forced into the ground to an excessive depth by the hitch 24 and, conversely, if the drawbar 28 rises relative to the disc, the front disc gang is not lifted out of the ground by the hitch.

The extent to which the hitch 24 may pivot upwardly without reducing the depth of penetration of the front disc gang 20 is limited by engagement of the front end of the outer strut element 46 with the shoulder 48 on the inner strut element 44. As hereinbefore explained, the range of relative movement before the front end of the outer strut element 46 engages the shoulder 48 may be varied by the threaded adjustment 54.

The motor 56 may or may not be subjected to fluid pressure during discing, depending on conditions. If the ground being disced is quite soft, the motor 56 may be energized in a direction to carry part of the weight of the disc on the wheels 84, thereby preventing penetration to an excessive depth.

Considering another phase of the operation of the invention, it will be assumed that the disc 10 is in the condition shown in FIG. 2 of the drawings, but that the tractive vehicle is not coupled to the hitch 24. When it is desired to couple the hitch 24 to the tractive vehicle, the tractive vehicle is first backed substantially into the coupling position and the fluid lines 66 and 68 are connected to the selector valve on the tractive vehicle. After locking the strut elements 44 and 46 together by inserting a pin through the hole 50 and one of the holes 52, the selector valve is set in a position to deliver fluid under pressure through the fluid line 68 to the rear end of the cylinder 60. The hitch 24 is lighter than the wheels 84, whereupon the cylinder 60 moves rearwardly relative to the piston 62 to pivot the lever 40 in the clockwise direction and out of engagement with the stop 43, such lever, in turn, acting through the locked strut 34 to move the hitch 24 upwardly. This process is continued until the front end of the hitch 24 registers with the drawbar 28, whereupon the tractive vehicle is backed into the coupling position to permit insertion of the coupling pin 30.

A similar procedure can be followed in uncoupling to relieve any vertical load acting between the hitch 24 and the drawbar 28 so that the coupling pin 30 may be withdrawn easily.

Thus, it will be seen that the present invention can be utilized to couple and uncouple the disc 10 from the tractive vehicle with a minimum of exertion, which is an important feature.

If, with the disc 10 coupled to the tractive vehicle, it is desired to transport the disc from one location to another without discing the ground, the invention may be utilized to elevate the disc into a transport position, shown in FIG. 4 of the drawings. All that is necessary is to set the selector valve on the tractive vehicle to deliver fluid under pressure through the front fluid line 66 to the front end of the cylinder 60. The resulting relative movement of the piston 62 and the cylinder 60 first seats the lever 40 against the stop 43, as shown in FIG. 4, if the lever 40 is not already seated against such stop, and then rotates the crank means formed by the arm means 72, the shaft 74 and the arm means 78 in the clockwise direction to pivot the arm means 78 downwardly and thus force the wheels 84 downwardly relative to the frame 12. This has the effect of lifting the frame 12 to elevate the disc gangs 20 and 22 to levels clear of the ground for transport purposes. As the frame 12 is lifted in this manner, the disc 10 tends to rock forwardly because of the unbalanced weight of the hitch 24, the strut 34 and the motor 56 forwardly of the wheels 84, such forward rocking of the disc being limited by engagement of the forward end of the outer strut element 46 with the shoulder 48 on the inner strut element 44, as shown in FIG. 4 of the drawings, to prevent further contraction of the strut 34. Thus, in effect, the strut 34 causes the hitch 24 to pick up the front end of the disc 10.

The invention provides latch means 92 for latching the disc 10 in its transport position. The latch means 92 comprises a latch member 94 which is pivotally connected to the main frame 14 at 96 and which is provided with a hook 98 adapted to hook over a pin 100 extending between the two arms forming the arm means 72. When the disc 10 penetrates the ground, the latch member 94 is disengaged from the pin 100, as shown in FIGS. 2 and 3 of the drawings.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:
1. In combination:
   (a) a frame having front and rear ends;
   (b) a cross shaft pivotally mounted on said frame intermediate said front and rear ends thereof;
   (c) wheel arms fixed on said cross shaft and having free ends;
   (d) wheels rotatably mounted adjacent said free ends of said wheel arms, respectively;
   (e) an actuator arm fixed on said cross shaft;
   (f) an upwardly extending lever pivotally mounted on said frame adjacent said forward end thereof for pivotal movement about an axis parallel to the axis of said cross shaft, said lever having a free upper end;
   (g) stop means on said frame and engageable by said lever for limiting forward movement of said free upper end of said lever;
   (h) an extensible and contractible actuating means interconnecting said actuator arm and said lever;
   (i) a hitch pivotally connected to said front end of said frame for upward and downward pivotal movement about a transverse axis;
(j) an extensible and contractible strut connected to said hitch and connected to said lever adjacent said free upper end thereof; and
(k) means on said strut for limiting contraction thereof.

2. In combination:
(a) a frame having front and rear ends;
(b) a cross shaft pivotally mounted on said frame intermediate said front and rear ends thereof;
(c) wheel arms fixed on said cross shaft and having free ends;
(d) wheels rotatably mounted adjacent said free ends of said wheel arms, respectively;
(e) an actuator arm fixed on said cross shaft;
(f) an upwardly extending lever pivotally mounted on said frame adjacent said forward end thereof for pivotal movement about an axis parallel to the axis of said cross shaft, said lever having a free upper end;
(g) stop means on said frame and engageable by said lever for limiting forward movement of said free upper end of said lever;
(h) an extensible and contractible actuating means interconnecting said actuator arm and said lever;
(i) a hitch pivotally connected to said front end of said frame for upward and downward pivotal movement about a transverse axis;
(j) an extensible and contractible strut connected to said hitch and connected to said lever adjacent said free upper end thereof;
(k) means on said strut for limiting contraction thereof; and
(l) releasable locking means engageable with said strut for locking same against extension and contraction.

References Cited in the file of this patent

UNITED STATES PATENTS

| | | |
|---|---|---|
| 1,845,178 | Paul | Feb. 16, 1932 |
| 2,344,123 | Brown | Mar. 14, 1944 |
| 2,349,257 | Evans | May 23, 1944 |
| 2,438,032 | Bready | Mar. 16, 1948 |
| 2,458,091 | Moore | Jan. 4, 1949 |
| 2,580,100 | Johansen | Dec. 25, 1951 |
| 2,717,479 | Scheidenhelm | Sept. 13, 1955 |
| 2,797,542 | Webster | July 2, 1957 |
| 2,803,358 | Elfes | Aug. 20, 1957 |
| 2,806,710 | Mascaro | Sept. 17, 1957 |

FOREIGN PATENTS

| | | |
|---|---|---|
| 188,308 | Great Britain | Aug. 30, 1923 |